US005633029A

United States Patent [19]
Cox et al.

[11] Patent Number: 5,633,029
[45] Date of Patent: May 27, 1997

[54] PREPARATION OF CONFECTIONS

[75] Inventors: David R. Cox, Bedford; Stephen R. Moore, Thrapston, both of United Kingdom

[73] Assignee: Good Humor-Breyers Ice Cream, Division of Conopco, Inc., Green Bay, Wis.

[21] Appl. No.: 565,513

[22] Filed: Nov. 30, 1995

[30] Foreign Application Priority Data

Nov. 30, 1994 [EP] European Pat. Off. ............. 94308835

[51] Int. Cl.⁶ .................................................. A23G 9/04
[52] U.S. Cl. ............................................................ 426/565
[58] Field of Search ................................ 426/565, 566, 426/567, 569, 66, 444, 524

[56] References Cited

U.S. PATENT DOCUMENTS

| | | | |
|---|---|---|---|
| 2,941,885 | 6/1960 | Tomlinson | 99/569 |
| 3,343,967 | 9/1967 | Rubenstein | 426/565 |
| 3,897,571 | 7/1975 | Homler et al. | 426/592 |
| 3,949,102 | 4/1976 | Hellyer et al. | 426/566 |
| 3,987,211 | 10/1976 | Dunn | 426/551 |
| 4,039,693 | 8/1977 | Adams et al. | 426/565 |
| 4,282,263 | 8/1981 | Barnes et al. | 426/572 |
| 4,334,934 | 6/1982 | Barnes et al. | 127/9 |
| 4,746,523 | 5/1988 | Binley | 426/249 |
| 4,808,428 | 2/1989 | Forsstrom et al. | 426/569 |
| 5,296,251 | 3/1994 | Ishida et al. | 426/592 |

FOREIGN PATENT DOCUMENTS

| | | |
|---|---|---|
| 0168537 | 1/1986 | European Pat. Off. . |
| 0201141 | 12/1986 | European Pat. Off. . |
| 2268472 | 11/1975 | France . |
| 2275155 | 1/1976 | France . |
| 63-222647 | 9/1988 | Japan . |
| 2261863 | 7/1992 | United Kingdom . |

OTHER PUBLICATIONS

European Search Report in European Patent Application No. 94308835.1.
Abstract of FR 2 275 155.
Abstract of FR 2 268 472.
Mullin, J., "Crystallisation Kinetics", Butterworth, 1972, pp. 178–179.
Toussaint, A. et al., "The Mixing Criterion in Crystallization by Cooling", *Chem. Eng. Sci.*, vol.. 29, (1974), p. 237.

*Primary Examiner*—Jeanette Hunter
*Attorney, Agent, or Firm*—James J. Farrell

[57] ABSTRACT

A suspension containing a large number of very small ice crystals in a sugar solution is obtained by mixing a concentrated sugar solution with a less concentrated sugar solution or water, both solutions having been cooled to a temperature of from just above the metastable limit temperature of the respective solution to just above the melting point of the respective solution prior to mixing.

9 Claims, No Drawings

PREPARATION OF CONFECTIONS

FIELD OF THE INVENTION

The preparation of a suspension of ice crystals is a usual stage in the manufacture of ice confections such as water ices, granitas, ice cream and slushes. These confections are formed from an aqueous solution of sugars, which may include optional ingredients for example flavours, fats, milk proteins, emulsifiers, gas, colours and fruit pulp.

BACKGROUND OF THE INVENTION

It is desirable to be able to provide a suspension of ice crystals having an average crystal size which is as small as possible.

Conventionally the suspension of ice crystals is manufactured in a scraped surface heat exchanger (SSHE). This process mixes and cools the aqueous solution of sugars simultaneously. A disadvantage of this process is that there is a temperature gradient between the wall of the SSHE and the centre, thus crystallisation is localised at the wall of the SSHE. This results in uneven crystal distribution.

A further disadvantage of using a SSHE to provide the ice crystal suspension is that a SSHE is an expensive piece of equipment.

Alternatively the suspension of ice crystals may be manufactured via quiescent freezing process within, for example, a lolly mould. Crystallisation occurs at the walls of the mould with growth of large, dendrite crystals into the centre of the product.

We have now been able to devise a simple process for producing the suspension of ice crystals, whereby ice crystals having the desirable small crystal size are produced. Furthermore, the process permits the formation of a large number of evenly distributed crystal nuclei. The process involves initially, individually cooling a first solution of concentrated sugar and a second solution of water or a less concentrated sugar solution prior to mixing the cooled solutions.

GENERAL DESCRIPTION OF THE INVENTION

Accordingly the invention provides a method of preparing a suspension comprising ice crystals in a sugar solution, wherein a first solution of concentrated sugar and a second solution of less concentrated sugar or water are individually cooled to a temperature of from just above the metastable limit temperature of the respective solution to just above the melting point of the respective solution prior to mixing; providing that if one or both of the solutions is cooled to a temperature of from just above the metastable limit temperature of the solution to below the melting point of the solution, the respective solution is supercooled.

The present invention provides a convenient method of preparing a suspension containing a number of relatively small ice crystals. The size of the ice crystals can be reduced further if at least one of the solutions is supercooled prior to mixing.

The term "just above the melting point" means the temperature is in the range up to about 5° C. above the melting point for ice in the solution.

The term "just above the metastable limit temperature" means the temperature is about 0.5° C. above the metastable limit temperature for the solution or higher.

The term "metastable limit temperature" is a well known term within the art. A suitable method for measurement is described in "Crystallization", J Mullin, Butterworth 1972, p178 & 179 & FIG. 6.4.

The first solution is a concentrated sugar solution. This solution will preferably have a concentration above about 45% w/w more preferably above about 55%.

The second solution is either water or a less concentrated sugar solution. Preferably the second solution is water because this the most efficient method for commercial use. The less concentrated sugar solution will preferably have a concentration below about 20% w/w, more preferably below about 10%.

The sugar will usually be sucrose but other sugars, e.g. glucose, dextrose and fructose can be used. In some procedures there may be a benefit in having different sugars in the two solutions.

Either solution may contain small quantities of flavouring, citric acid, sodium citrate, fats, milk proteins, emulsifiers, gas, fruit pulp, fruit juice or stabiliser.

The use of greater than two solutions having either different or identical sugar concentrations, each solution being individually cooled to a temperature of from just above the metastable limit temperature of the solution to just above the melting point of the solution prior to mixing, is clearly possible and falls within the scope of the present invention as claimed; providing that at least one solution is of concentrated sugar and at least one solution is of less concentrated sugar or water.

Typically the process of the invention will provide an ice suspension containing from 0.5 to 10% by weight ice crystals in a sugar solution. This ice suspension forms rapidly. The level of ice formed is too low for commercial use as, for example, an ice cream or a water ice. Therefore a second freezing step is required to increase the phase volume of ice in the suspension. This second freezing step is required to increase the phase volume of ice in the suspension. This second freezing step may occur simultaneously with the mixing step. Alternatively, the ice suspension according to the invention may be prepared first and then introduced into a suitable freezing system.

Advantageously any convenient means for mixing the cooled solutions may be used. Use of different mixing processes will modify the size and/or shape of the crystals produced.

Thus static mixers which pass streams of liquid through a non-moving mechanical device arranged to bring the steams together and rapidly mix them can be used. An example is the Kenics mixer. This route provides a resultant stream containing the suspension of fine ice crystals. The method of the invention also extends to introducing the streams into a vessel, e.g. a mould, optionally containing a stirrer. This route allows the suspension to be formed in a vessel in a coolant, so the suspension is then quiescently frozen.

An alternative route is to have the mixing step performed in a vessel capable of providing dynamic freezing, e.g. scraped surface heat exchanger (SSHE) or a cavity transfer mixer. In this route the suspension of ice crystals is formed within the apparatus providing the second freezing step.

Thus the method forms the large number of small crystals in the bulk of the water and not on the surface of a containing vessel.

After preparing the suspension as a stream it can be led to a SSHE within which the freezing is completed. Aeration may be introduced at this stage.

One or both of the solutions may be supercooled prior to mixing. Supercooling enables particularly small ice crystals to be formed.

By supercooled is meant that the solution has been cooled to a lower temperature than the melting temperature for ice in solution without ice being formed. In order to supercool a solution, the solution is cooled slowly. Supercooling may be achieved by any known technique or may be effected by cooling the solution in a system in which the coolant temperature is never below the metastable limit of the solution.

In order to provide the desired final ice confection, e.g. water ice, ice cream, granita, slush, the resultant suspension of ice crystals may be mixed with the components of the ice confection. Alternatively, and preferably, the components of the ice confection may be added to one or both of the solutions used to prepare the initial ice suspension. Typically the additional components of the ice confection will be included in the water or less concentrated sugar solution. A further alternative is the components of the ice confection may be added at the mixing stage.

SPECIFIC DESCRIPTION OF THE INVENTION

Examples will now be given to illustrate but not limit the method of the invention.

Water ice slurries were formed by mixing two solutions.

A concentrated sucrose stream A (30–62% w/w sucrose) was cooled to a temperature in the range 0°–4° C. higher than its equilibrium melting point. This was mixed with a dilute sucrose stream B (0–15% w/w sucrose) which was cooled to a temperature in the range 0°–4° C. higher than its equilibrium melting point. Either stream may contain small quantities of flavouring, citric acid, sodium citrate, fruit juice or stabilizer, e.g. guar and LBG. The two streams were mixed at a weight ratio between 8:1 and 1:2 of the concentrated (A) to the dilute stream (B). The total flow was 300 Kghr$^{-1}$. This created a mixed stream with an initial temperature lower than the equilibrium melting point of the stream and some of the water crystallised. The stream had a temperature in the range from −18° C. to −3.0° C.

The mixer used was a Kenics static tube mixer (obtainable from Chemineer Ltd, Derby, England) comprising a tube 30 cm long with a 2.5 cm diameter. This tube contained 12 curved elements arranged along the tube parallel to the liquid flow with alternative elements being perpendicular to the adjacent elements. Each curved element rotates the liquid flow in a different direction.

An alternative mixer is the Sulzer type (obtainable from Sulzer-Chemtech, Winterhur, Switzerland).

This mixing created a physical environment in which ice crystals formed spontaneously. A water ice slurry was formed which contained between 0.5% and 15% w/w ice. Four examples were performed and their conditions are quoted in Tables I and II. The resultant ice slurries had calculated mass fractions from 1% to 5%.

The final structure obtained after the second freezing stage had a soft texture and was distinct from the dendritic structure provided by quiescent freezing.

TABLE I

| | STREAM A | | STREAM B | | | |
| --- | --- | --- | --- | --- | --- | --- |
| Ex | Sucrose concent- ration (% w/w) | Temper- ature (°C.) | Sucrose concent- ration (% w/w) | Temper- ature (°C.) | Flow Ratio (A/B) | Ice content* (mass fraction) |
| I | 62 | −13.5 | 0 | 0 | 1 | 0.05 |
| II | 50 | −7.1 | 0 | 0 | 1.6 | 0.01 |
| III | 62 | −13.5 | 15 | −1.1 | 0.5 | 0.02 |
| IV | 55 | −9.2 | 15 | −1.1 | 0.67 | 0.01 |

*calculated

TABLE II

| Melting points of solutions used: | |
| --- | --- |
| Sucrose (% w/w) | °C. |
| none | 0° |
| 15 | −1° C. |
| 50 | −7.5° C. |
| 55 | −9.3° C. |
| 62 | −13.8° C. |

This slurry, which comprised a mass of very small ice crystals, was then frozen further in a second stage in a blast freezer or a similar apparatus to give a water ice with an unusual structure which retained the large number of small crystals. The resultant ice slurry was subjected to downstream freezing to generate a commercially usable water ice. This downstream, i.e. post mixing, freezing stage can be quiescent, for example in moulds passed through freezing zones, or with movement, for example in a scraped surface heat exchanger. Examples of freezing zones for quiescent freezing are brine baths in which moulds are placed and freezing tunnels using very cold gasses. The precise freezing regime used will depend on the structure and shape desired in the final product.

A process identical to the above was used to prepare aerated water ice. Either the concentrated or the dilute stream was aerated with air (or any suitable gas) prior to the mixing step. Small air bubbles were distributed throughout the suspension and became entrapped in the frozen product.

The method is particularly applicable to the formation of water ices but can also be used in the preparation of other foodstuffs in which ice is a component. Thus the method can be used in the preparation of ice cream.

EXAMPLE V

A water ice slurry was formed by mixing two solutions.

A concentrated sucrose stream A (62 wt %) was cooled to −10.9° C. This was mixed with water having additionally wt % citric acid, 0.7 wt % sodium citrate, 0.3 wt % lemon flavour which had been cooled to 0.3° C. The two streams were mixed at a weight ratio of 1:1. The total flow was 3.3 kg/min. The mixer used was a 12 element kenics mixer. Ice crystals were observed in the exit stream which had a temperature of −2.1° C.

EXAMPLE VI

A water ice solution was formed by mixing two solutions. 0.45 kg of 55 wt % sucrose solution (melting point −9.2° C.) was cooled to −7.5° C. This was mixed with 0.5 kg of water which had been supercooled to −1.7° C. Mixing was achieved using a Rushton turbine rotating at 200 rpm. Ice crystals were observed to form almost immediately in the mixture.

EXAMPLE VII

Sucrose solution (60 wt %) at −12.8° C. was mixed with water at 0.1° C. in a weight ratio of 3:2 in a Rushton turbine mixer at 240 rpm to form stream A containing a slurry of ice crystals.

Stream B was a composition containing, by weight,

| | |
|---|---|
| water | 53.8% |
| skimmed milk powder | 25.0% |
| butter fat | 20.0% |
| locust bean gum | 0.4% |
| emulsifier | 0.8% | which was pasteurised and homogenised. Streams A and B (at −2.6° C.) were mixed at a weight ratio of 1:1 and the resulting stream was simultaneously aerated with added Nitrogen and sheared to give a stiff product. This product was then hardened quiescently to −16° C. to give an ice cream confection.

We claim:

1. A method of preparing a suspension comprising ice crystals in a sugar solution, said method comprising:
   (i) cooling a first solution of concentrated sugar to a temperature of from just above the metastable limit temperature of the solution to just above the melting point of the solution;
   (ii) cooling a second solution of less concentrated sugar or water to a temperature of from just above the metastable limit temperature of the solution to just above the melting point of the solution;
   (iii) mixing the cooled solutions obtained in steps (i) and (ii) to form a suspension comprising ice crystals in a sugar solution;
providing that if one or both of the solutions of steps (i) and (ii) is cooled to a temperature of from just above the metastable limit temperature of the respective solution to below the melting point of the respective solution, the respective solution is supercooled.

2. A method according to claim 1 wherein the first solution is a concentrated sugar solution having a sugar concentration above about 45% w/w, preferably above about 55% w/w.

3. A method according to claim 1 wherein the second solution is selected from the group consisting of water and a less concentrated sugar solution having a sugar concentration below about 20% w/w preferably below about 10% w/w.

4. A method according to claim 1, wherein at least one solution has a temperature of from just above the metastable limit temperature of the solution to below the melting point of the solution.

5. A method according to claim 1, wherein both the first and the second solutions have a temperature of from just above the metastable limit temperature of the respective solution to below the melting point of the respective solution.

6. A method according to claim 1 wherein at least one solution has a temperature at or just above its melting point.

7. A method according to claim 1 wherein both the first and the second solutions have a temperature at or just above their respective melting points.

8. A method of preparing a product containing an ice suspension wherein the suspension of claim 1, is subjected to a freezing step simultaneous to the mixing step.

9. A method of preparing a product containing an ice suspension wherein the suspension of claim 1 is subjected to a freezing step after mixing.

* * * * *